Sept. 30, 1958    M. D. WELSH    2,854,060
BABY SEAT
Filed Oct. 7, 1955    2 Sheets-Sheet 2
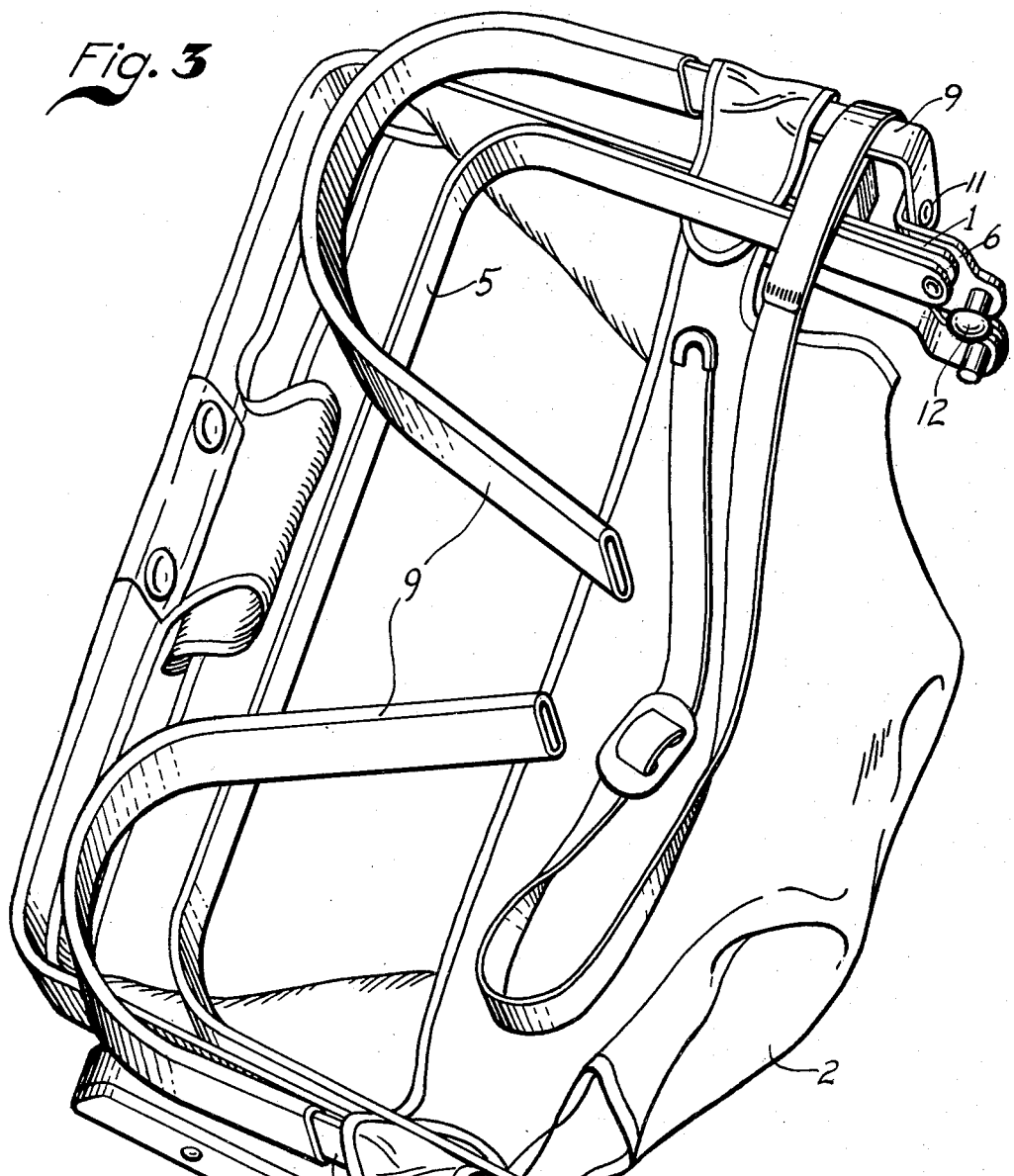
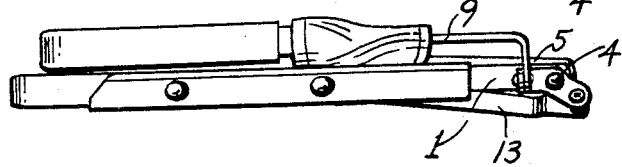
INVENTOR.
Matilda D. Welsh
BY John Hassidy
ATTORNEY

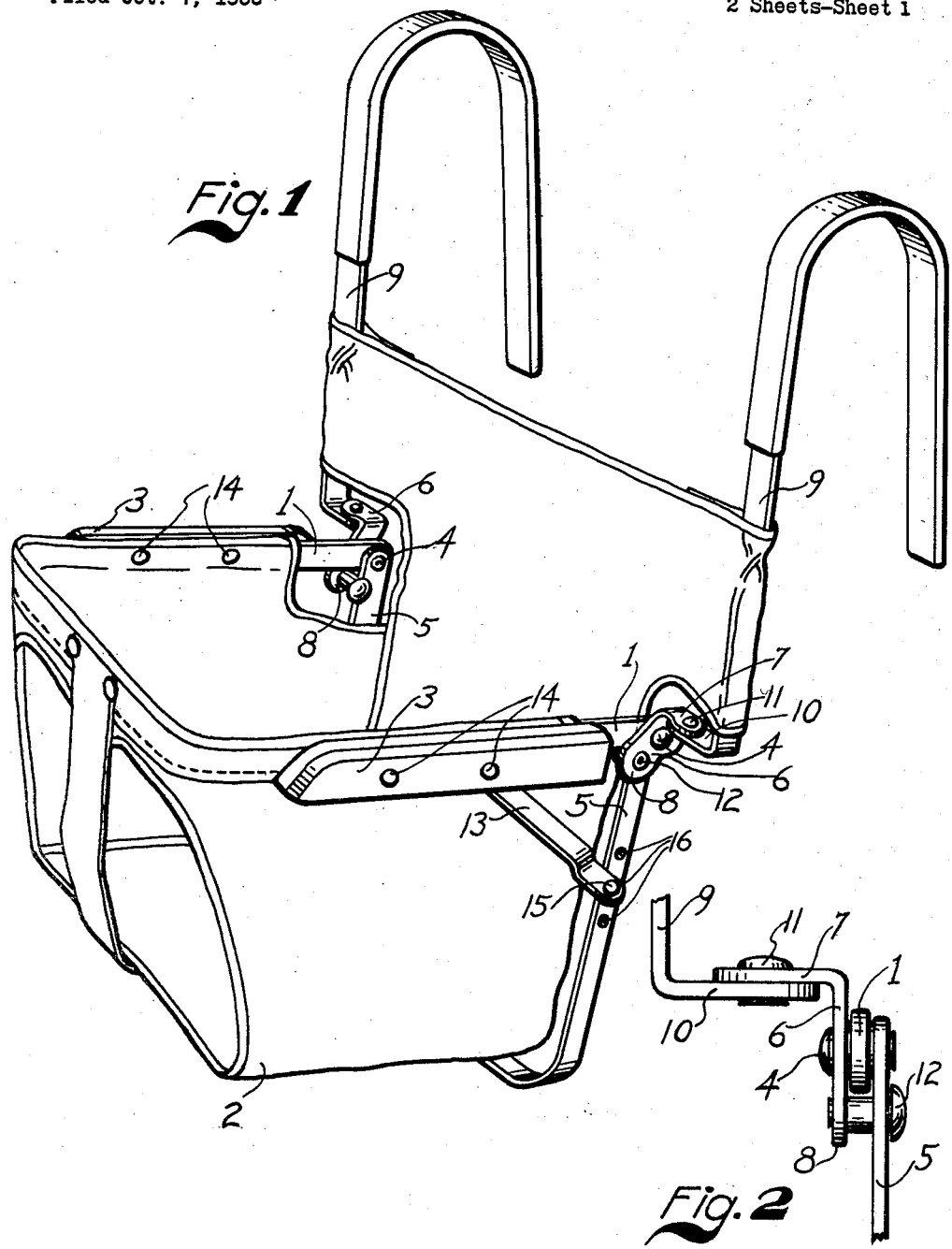

United States Patent Office 2,854,060
Patented Sept. 30, 1958

2,854,060
BABY SEAT
Matilda D. Welsh, Ladue, Mo.
Application October 7, 1955, Serial No. 539,207
3 Claims. (Cl. 155—11)

This invention pertains to a baby seat of the type which may be used in traveling by automobile, the seat being provided with hooks to hook over the back of a car seat.

An object of this invention is to provide a seat of this type which is of simple construction and which, when not in use, may be folded into compact form so as to take up a minimum of space.

Another object is to provide such a seat which is adjustable in accordance with the slope of the back of the car seat so as to hold the baby seat level.

Generally stated, the seat comprises a front bow supported in horizontal position and having suspended therefrom a baby seat of the usual design made of flexible fabric but provided with a stiff bottom. The rear ends of this front bow are pivoted to the ends of the bottom bow, which extends downward therefrom. Also pivoted to these bow ends on the same pivot pin is a bracket having an out-turned ear to which is pivoted a hook adapted to be place over the back of the car seat to support the structure. At these end pivots, the bottom bow is positioned inside and the bracket outside of the ends of the front bow. This arrangement permits the bottom bow to be swung about the pivot to a collapsed position within the front bow. At the same time, the hook may be folded downward upon the front bow and inward so as to overlie the bottom bow. When the device is in extended position, a brace is provided connecting the front bow with the bottom bow and adjustable at its connection with the latter so that the angle of the bottom bow may be varied to suit the slope of the car seat back.

A preferred embodiment of this invention is illustrated in the accompanying drawings, in which—

Fig. 1 is a perspective view of the baby seat in position to hang on the top of an auto seat;

Fig. 2 is a detail of the hinge portion of the baby seat, looking from the rear of the near pivot in Fig. 1;

Fig. 3 is a top perspective view of the collapsed baby seat; and

Fig. 4 is a side view of the collapsed baby seat.

As shown in the drawing, the structure comprises a front bow 1 on which a seat structure 2 of any suitable design may be supported. Arm rests 3 may be provided, attached to the side members of the front bow 1. Pivoted to each rear end of the front bow 1 by a pivot pin 4 is a bottom bow 5 and a bracket 6. As shown in Fig. 2, the bottom bow 5 is on the inside and the bracket 6 on the outside of the end of the front bow 1.

The bracket 6 has an out-turned ear 7 at its upper end and a forward extension 8 at its lower end. A hook 9 adapted to be suported on the back of the car seat has its lower end 10 bent inwardly and pivoted to the horizontal ear 7 by a vertical pivot pin 11. It will be seen that by virtue of this structure, the bottom bow 5 may be folded to collapsed position on the two pivot pins 4 by moving it rearward, then upward and then forward to a position in the same plane with the front bow 1. The relative dimensions of these bows are such that the bottom bow 5 will lie wholly within the front bow 1 when in this collapsed position. When the bottom bow has been folded in this manner, the hook 9 may be folded down upon it by pivoting the bracket 6 on the pin 4 and then folding the hook 9 inward on the pivot pin 11, so that the entire structure is folded to the collapsed position shown in Fig. 3.

When the structure is extended, the folding movements are executed in the manner opposite to those described above until the bottom bow 5 extends downward from its pivot, and the hook 9 extends upward therefrom. The forward extension 8 of the bracket 6 carries a stop pin 12 which extends inward from the bracket so as to be positioned below the front bow 1 and in front of the bottom bow 5 so as to limit further movement of these bows toward each other from their open position, as shown in Fig. 1. A brace 13 is pivoted to the front bow 1 as by a pin 14. Its lower end carries a pin 15 insertable in any one of several holes 16 in the side arm of the bottom bow 5. By inserting the pin 15 in one or the other of the holes 16, the angle of the bottom bow 5 with respect to the front bow 1 may be adjusted. By the action of the stop pin 12, the hooks 9 will also be held at substantially the same angle. In this way, the front bow 1 can be held at a substantially level position, whatever the slope of the seat back may be.

It will be seen that this invention provides a simple structure for such a baby seat, and one which can be collapsed so that all parts lie in very nearly the same plane. Accordingly, very little storage space is required therefor when not in use.

Various changes may be made in the details of construction, within the scope of the appended claims, without departing from the spirit of this invention. Parts of the invention may be used without the whole and improvements may be added while retaining some or all of the advantages of the invention.

I claim:

1. In a baby seat of the character described, a front bow for supporting a seat, a bottom bow, a pair of hooks formed for engagement with a car-seat back, and brackets, each rear end of said front bow being pivoted by a horizontal pivot pin to one end of said bottom bow and one of said brackets with the end of the bottom bow on the inside and the bracket on the outside of the end of the front bow, each bracket having an out-turned horizontal ear to which one of said hooks is pivoted by a vertical pivot pin, said bottom bow being adapted to be moved on said horizontal pivot pins rearwardly, upwardly and forwardly to a collapsed position within said front bow and said hooks are adapted to be folded inwardly on said vertical pivot pins and downwardly with said brackets on said horizontal pivot pins to a collapsed position over said front and bottom bows.

2. In a baby seat of the character described, a front bow for supporting a seat, a bottom bow, a pair of hooks formed for engagement with a car-seat back, a pair of brackets, each rear end of said front bow being pivoted by a horizontal pivot pin to one end of said bottom bow and one of said brackets with the end of the bottom bow on the inside and the bracket on the outside of the end of the front bow, each bracket having an out-turned horizontal ear to which one of said hooks is pivoted by a vertical pivot pin, said bottom bow being adapted to be moved on said horizontal pivot pins rearwardly, upwardly and forwardly to collapsed position within said front bow and said hooks being adapted to be folded inwardly on said vertical pivot pins, and a stop pin on said bracket extending underneath said front bow and in front of said bottom bow in the extended position of the baby seat to limit the forward movement of the latter toward the former on said horizontal pivot pins and to position said hook for engagement with a car-seat back.

3. In a baby seat of the character described, a front bow for supporting a seat, a bottom bow, a pair of hooks formed for engagement with a car-seat back, a pair of brackets, each rear end of said front bow being pivoted by a horizontal pivot pin to one end of said bottom bow and one of said brackets with the end of the bottom bow on the inside and the bracket on the outside of the end of the front bow, each bracket having an out-turned horizontal ear to which one of said hooks is pivoted on a vertical pivot pin, said bottom bow being adapted to be moved on said horizontal pivot pins rearwardly, upwardly and forwardly to baby seat collapsed position within said front bow and said hooks being adapted to be folded inwardly to baby seat collapsed position, a stop pin on said bracket extending underneath said front bow and in front of said bottom bow in baby seat extended position to limit the forward movement of the latter toward the former on said horizontal pivot pins and to position said hook for engagement with a car-seat back, and brace means pivotally secured to said front bow and adjustably attachable to said bottom bow to vary the angle between said bows.

References Cited in the file of this patent

UNITED STATES PATENTS

| | | |
|---|---|---|
| 828,965 | Pike | Aug. 21, 1906 |
| 2,546,790 | Shook | Mar. 27, 1951 |
| 2,697,477 | Welsh | Dec. 21, 1954 |